INVENTOR.
WALTER A. STEINBERG

INVENTOR.
WALTER A. STEINBERG

United States Patent Office 3,560,830
Patented Feb. 2, 1971

3,560,830
POSITIONAL CONTROL SYSTEM WITH BACKLASH COMPENSATION
Walter A. Steinberg, Huntington Station, N.Y., assignor to Autonumerics, Inc., Westbury, N.Y., a corporation of New York
Filed Mar. 19, 1969, Ser. No. 808,526
Int. Cl. G05b 11/01
U.S. Cl. 318—630            10 Claims

ABSTRACT OF THE DISCLOSURE

A positional control system is disclosed which includes means for automatically compensating for backlash in the feed screws coupling the drive motors to the driven machine member. When the displacement of the machine member along a given axis is to be in the same direction as the preceding displacement along that axis, a direction comparator routes control pulses to the drive motor through a position control. The number of pulses transmitted to the motor is determined by a counter which has been set to cut off the position control when the number of transmitted pulses corresponds to the magnitude of the desired displacement. When the displacement of the machine member is in the opposite direction from the preceding displacement along a given axis, the direction comparator routes the control pulses to the drive motor through a backlash control. The number of pulses transmitted to the motor is controlled by a backlash storage unit which is preset to cut off the backlash control through the direction comparator and switch the pulses to the position control when the motor rotation is equal to the feed screw backlash.

BACKGROUND OF THE INVENTION

This invention relates to a control system for positioning a machine member and, in particular, to a positional control system which automatically compensates for backlash in the mechanical linkage coupling the control system to the machine member.

The automatic operation of machine tools in accordance with stored instructions is well known. In such systems, data is generally taken from a drawing or directly from a part to be reproduced and transferred to a punched or magnetic tape. The tape is used as the input to a controller which translates the information into electrical pulses which energize drive motors coupled through a mechanical linkage to the machine member. The number of pulses received by a drive motor determines the total distance through which the machine member will be moved along a given axis, while the rate at which the pulses are received determines the speed at which the movement will take place. The controller is usually provided with several channels which may control machine movement in different axes and perform auxiliary functions. For example, the quill and the longitudinal and cross feed drives of a vertical milling machine are suitable for control by such systems.

A problem inherent in all automatic machine-tool positioning systems is the need to approach as closely as possible to a one-to-one correspondence between the desired position of the machine member, as recorded on the input tape, and the actual position the member finally assumes. It is possible by means of suitable electronic circuits, to obtain extremely close correspondence between the input data and the displacement of the drive motor shafts; however, backlash in the mechanical linkages (such as the feed screws) between the shafts and the machine member being positioned will prevent accurate positioning unless some means of backlash compensation is provided.

The effect of backlash may be minimized by driving the machine member so that it approaches the desired position from a selected direction only. When reversal of the machine member is required, the member may be moved past the desired position and then reversed to approach the position from the selected direction. This technique is limited however since overshooting the desired position is not practical for many machining operations such as window milling. Also, some machine tools are provided with mechanical backlash compensating devices but these are not entirely satisfactory when precision positioning is required.

Accordingly, it is an object of my invention to provide an improved machine tool positioning system which compensates automatically for backlash in the mechanical linkages between the drive motors and machine member.

SUMMARY OF THE INVENTION

The invention comprises a control system for positioning a machine member in accordance with a set of predetermined input instructions. The system includes means for storing data defining the backlash characteristics of the mechanical linkage coupling the control system to the machine member together with means for using these data when sequential movements of the machine member along a given axis are in opposite directions.

The input shafts of the machine tool are coupled to motor driving means which may be synchronous stepping motors of the type wherein the magnitude of the angular rotation of the rotor is proportional to the total number of pulses applied to the motor stator and the speed of the rotor is proportional to the rate at which the pulses are applied. Such a system operates in an open loop configuration and therefore it is assumed that each motor takes a number of steps equal to the number of pulses applied to it and that the actual position assumed by the machine member corresponds to the number of pulses applied to the drive motors. Alternatively, a closed loop configuration may be employed wherein the motor is driven by a signal proportional to the difference between the actual position of the machine member and the input instructions.

A pulse generating means is coupled to the step motors by first and second control means. The first control means, the position control, transmits the output of the pulse generator to the step motors to effect the actual positioning of the machine member. The second control means, the backlash control, transmits the output of the pulse generator to the step motors when a reversal in direction of the machine member requires compensation for the backlash inherent in the mechanical linkage. Directional comparison means coupled to the inputs of the position and backlash controls compares the directional component of the input instructions with the directional component of the immediately preceding input instructions. If the direction is the same, the backlash control is cut off and the position control actuated permitting positioning pulses to reach the stepping motors. If the directional component of the input instructions is the reverse of the preceding instructions, the backlash control is actuated and the position control cut off.

Pulses transmitted through the backlash control are counted by a backlash storage means which compares the number of pulses transmitted with preset backlash data for the mechanical linkage of the machine being controlled. When the number of transmitted pulses has provided a displacement equal to this preset value, the directional comparison means cuts off the backlash control and actuates the position control. Pulses are then transmitted through the position control causing the drive motors to be displaced by an amount corresponding to the change of position required by the input signal. When the number of pulses transmitted by the position control is equal to that required to provide the desired displacement, the position control is cut off.

DETAILED DESCRIPTION OF THE PREFERRED EMBODIMENT

Figure 1:
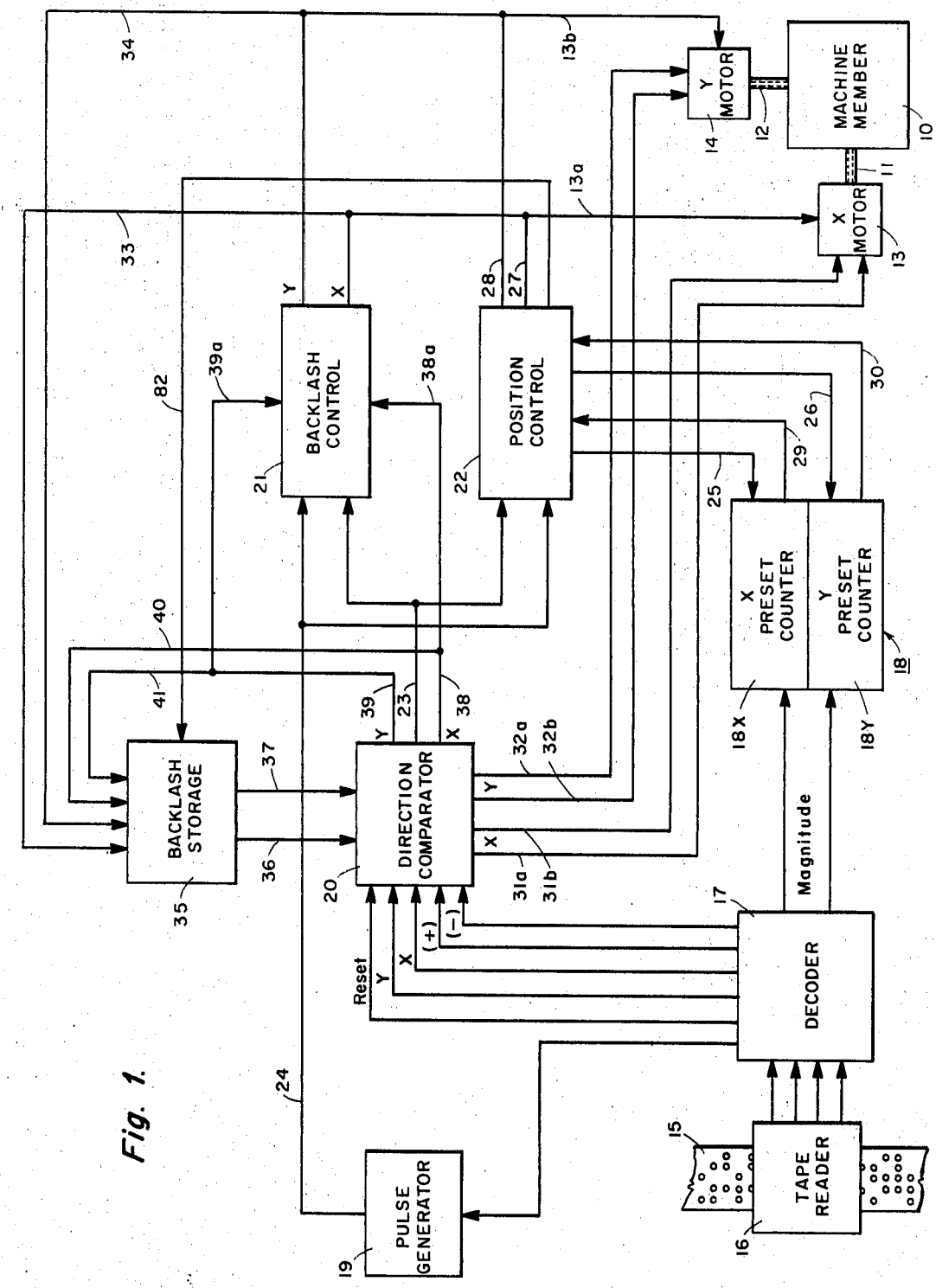
FIG. 1 is a block diagram showing the control system and the machine member being positioned.

The invention will first be described in general functional terms with reference to the block diagram of FIG. 1. As shown, a machine member 10 is positioned by feed screws 11 and 12 driven by X and Y stepping motors 13 and 14 respectively. Member 10 may, for example, be the table of a milling machine and screws 11 and 12 the longitudinal and cross feed drives of the table. For convenience, the circuits which control signals to the motor 13 have been given the designation X and the circuits controlling signals to the stepping motor 14 have been given the designation Y. While the control system will be described for positioning a machine member such as the table 10 along two axes it is to be understood that the system is applicable for the control of any positionable element along any number of axes.

Predetermined input instructions are introduced into the system in the form of a flexible tape 15 which is coded with a series of holes disposed in the transverse rows along the tape. A hole at a given point indicates that a "one" is associated with that position while the absence of a hole at a particular point indicates that a "zero" is associated with that position. Typically, a given row of holes might indicate that a displacement is to be made in the X direction, the next row the direction of the displacement, whether right or left, the next several rows the decimal digits corresponding to the magnitude of the displacement, the next row the speed of displacement with the last row providing the signal to stop the tape and start the actual positioning in accordance with the preceding rows of information. It will be understood that the tape may be magnetically coded rather than punched.

The information coded onto the tape may be calculated directly from a blueprint of the part to be cut and from a knowledge of the optimum cutting rate for the material and type of cutting tool being used. A tape reader 16 extracts the information from the punched tape and transfers it to a decoder 17 which loads the preset counters 18, sets pulse generator 19 and provides signal inputs to direction comparator 20 in accordance with the taped instructions.

Preset counters 18 comprise an X counter 18x and a Y counter 18y which receive the displacement information for each axis by being set to the nines complements of the decimal digits of the desired displacements. As shall be explained hereinafter, the preset counters count the pulses supplied to the step motors 13 and 14 through a position control 22 until each counter reaches zero and then cut off further pulses to the motors. The duplicate counting channels permit simultaneous control of both the X and Y step motors.

Pulse generator 19 provides timing pulses to the X and Y motors 13 and 14 through backlash and position controls 21 and 22. The repetition rate of the pulses produced by generator 19 is determined for each command by the taped input, the positioning speed of machine member 10 being proportional to the pulse repetition rate.

Motors 13 and 14 are of the synchronous stepping type in which the motor shaft rotates through one increment for each pulse supplied to a control terminal of the motor driver thereof. The total displacement of the motor is equal to this movement multiplied by the number of pulses applied. The time required to make the total displacement is determined by the repetition rate of the pulses produced by generator 19, the pulses being applied to motors 13 and 14 over leads 13a and 13b respectively. The directions of rotation of the X motor 13 and Y motor 14 are determined by the polarities of the voltages applied by direction comparator 20 across the motor driver direction terminals by leads 31a, 31b and leads 32a, 32b, respectively. Hereinafter in the specification and drawings, the motor driver and motor shall be referred to for simplicity as the "motor."

The tape reader 16, decoder 17, preset counters 18, pulse generator 19 and stepping motors 13 and 14 are conventional and will not be described in greater detail except where necessary for an understanding of the backlash compensation system of the present invention.

Inputs corresponding to the axis (X or Y) along which the member 10 is to be displaced and the direction of movement along the selected axis are applied to direction comparator 20 by decoder 17. In addition to accepting the direction instructions for both axes, the direction comparator stores the last direction of motion of both axes. If the desired displacement along a given axis is in the same direction as the previous displacement, the backlash control 21 is cut off and the position control 22 activated via lead 23 by a signal from direction comparator 20. Pulses from generator 19 then enter position control 22 via lead 24 and start preset counters 18x and 18y by way of leads 25 and 26 while simultaneously energizing step motors 13 and 14 via leads 27 and 28 respectively. Means are provided to prevent the first pulse from being transmitted to the motors, causing each counter to receive one pulse more than its associated motor. When either counter 18x or 18y reaches zero, the corresponding axis of machine member 10 has been moved to its desired position and further pulses to that motor are cut off by means of a signal transmitted from the counter over lead 29 or 30. Pulses continue to the other axis until its counter also reaches zero. The direction of rotation of the X and Y motors is determined by the relative polarity of the voltages across their windings as supplied from the direction comparator via leads 31a, 31b, and 32a, 32b respectively.

If the desired displacement along a given axis is in the opposite direction from the previous displacement along that axis, the polarity of the voltage across the windings of the corresponding motor is reversed by the direction comparator. Thus, if lead 31a is positive with respect to lead 31b for a displacement from left to right of the member 10 by the X motor, a coded input requiring the following displacement to be from right to left would require that lead 31b be made positive with respect to lead 31a. However, reversing the motor direction usually introduces a positioning error due to backlash in the feed screw. This occurs because the first few pulses from generator 19 are absorbed in taking up the backlash and hence the displacement of the table becomes equal to the desired displacement less the backlash inherent in the feed screw.

Figure 2:
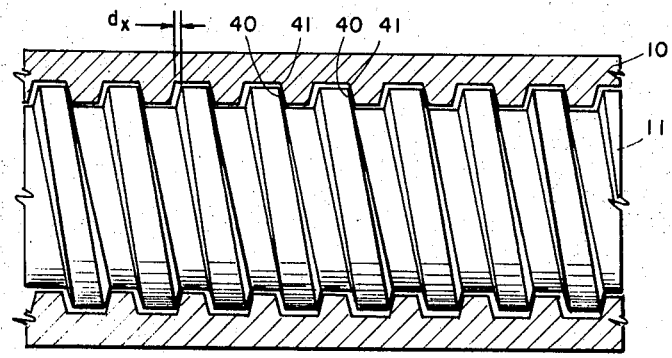
FIG. 2 is a cross-sectional drawing of a feed screw illustrating how reversal in the direction of movement of the feed screw introduces backlash.

The effect of backlash is illustrated in FIG. 2 which shows the feed screw 11 driving the machine member 10 from left to right. The faces 40 of screw 11 are in contact with the surfaces 41 of member 10 and will remain in contact as long as the motion of the screw is in the same direction. However, when the direction of feed screw 11 is reversed the screw must move through a backlash distance $d_x$ before the member 10 will begin moving. Thus, the number of pulses which must be applied to the stepping motor is greater if the direction of motion is reversed from the previous direction than if the direction of motion remains the same. For example, if N pulses must be applied to the motor to move the member 10 through a distance L when the direction is the same as for the previous displacement, then N plus a number of pulses corresponding to the distance $d_x$ would be required to move member 10 the same distance L if the direction of motion were reversed.

When the direction comparator 20 receives an input from decoder 17 indicating that the direction of motion along an axis should be reversed, it cuts off the position control 22 and actuates the backlash control 21. This is in addition to reversing the polarity across the motor winding as previously explained. Pulses from generator 19 are then routed through backlash control 21 to the X or Y motor and, via lead 33 or 34, to the backlash storage unit 35. The backlash storage unit counts the pulses applied over lead 33 or 34, and, when the number of pulses received is equal to a preset value corresponding to the backlash, transmits a signal to the direction comparator 20 over lead 36 or 37. This signal causes the direction comparator to cut off the backlash control 21 and actuate position control 22. The pulses from generator 19 are then transmitted through the position control 22 to the motors which cause the machine member 10 to be displaced until the pulses are cut off by signals to the position control from the preset counter 18.

The backlash storage unit 35 is provided with memory units for both the X and Y channels. The backlash $d_x$ for feed screw 11 is set into the X memory unit of storage unit 35 and the backlash $d_y$ for feed screw 12 is set into the Y memory unit. For example, in a typical machine tool the backlash $d_x$ for the feed screw 11 might be measured as 0.009 inch and the backlash $d_y$ for the Y feed screw 12 found to be 0.014 inch. In a control system capable of positioning machine member 10 in 0.001 inch movements per command, each pulse will rotate the step motor through and angles corresponding to a 0.001 inch displacement of the machine member. Thus, assuming a command signal calling for a reversal of direction along the X axis, the storage unit 35 will count nine pulses received from the output of backlash gate 21 via lead 33 before transmitting a signal to the direction comparator 20 which will shut off the X channel of the backlash control 21 via lead 38 and 38a. If the command signal also calls for a reversal in direction along the Y axis, the backlash storage unit 35 will continue to count the Y pulses received from backlash control 21 over lead 34 until 14 pulses have been counted. It will then transmit a signal to the direction comparator 20 indicating that both X and Y channel backlash has been taken up and comparator 20 will transmit a signal via lead 23 which will cut off backlash control 21 and activate position control 22. Signals are also transmitted from comparator 20 to backlash storage unit 35 via leads 40 and 41 to energize the X and Y memories respectively of the storage unit. All pulses from generator 19 will thereafter pass through the position control 22 to the motors and be counted by the preset counters 18 as previously described.

In the event the Y backlash was less than the X backlash and the command signal called for a reversal in both channels, the Y channel of the backlash control 21 would have been cut off first by a signal from comparator 20 via leads 39 and 39a after the appropriate number of pulses were counted.

Figure 3A:
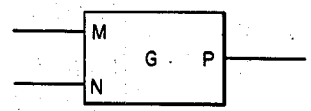
FIGS. 3a, 3c and 3d show logic units used in the system.
Figure 3D:
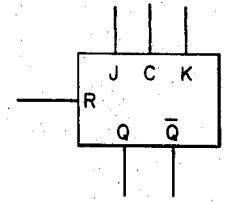
Figure 3C:
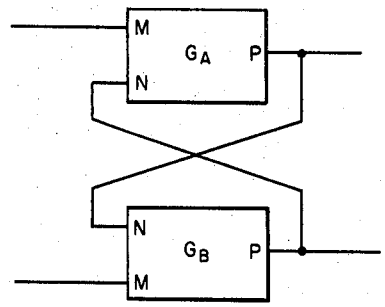

The invention may be understood in more detail by reference to FIGS. 4–7 which are schematic diagrams of the direction comparator 20, backlash storage 35, backlash control 21 and position control 22, respectively. FIGS. 3a, 3c and 3d illustrate the three types of logic modules used in the block diagrams of FIGS. 4–7. FIG. 3a shows the symbol for a NAND-NOR gate G having two inputs M and N and an output P. The number of inputs may be one or more and is not limited to two. All gates operate such that their output is high if any input is low, and the output is low if all inputs are high. For example, in a typical gate, if one or more inputs are at 0 volts (low), the output is at +5 volts (high). If all inputs are at +5 volts, the output is at 0 volts.

Figure 3B:
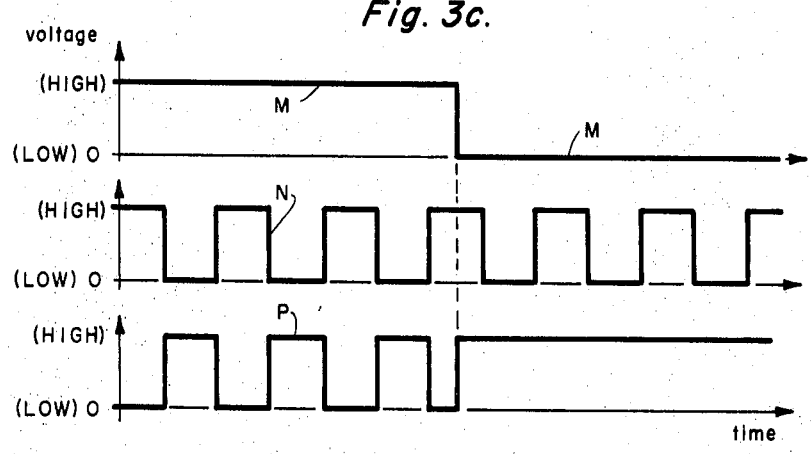
FIG. 3b depicts the voltage waveforms at the inputs and output of the gate of FIG. 3a when pulses are applied to one of the inputs.

Gate G will transmit a negative pulse applied to one input only when all other inputs are high. This is shown in FIG. 3b where it is assumed that the M input is high for the first three pulses applied to the N input of the gate and then is changed to a low, or zero voltage, state for three cycles. When M is high, the output P is low between pulses and is driven high each time a negative pulse is applied to the N input thereby effectively transmitting the pulse through the gate. When the M input drops to its low state, the pulses at the N input have no effect on the output P which is in a high state due to the low voltage at the M input.

FIG. 3c illustrates a dual-gate consisting of two gates $G_A$ and $G_B$, each having its output P coupled to the N input of the other gate. If the M inputs of gates $G_A$ and $G_B$ are high, then the output of one gate will be high and the output of the other gate low. If the M input of the gate having a high output is made low the gate outputs will not change state; however, if the M input of the gate having a low output is made low, the output states of both gates will reverse.

When the M input to both gates is low, both outputs are high. Making either gate high will change its output to low but leave the other gate high. In the description of direction comparator 20, the dual gates will be identified by the numeral assigned to the individual A and B gates comprising the dual gate.

FIG. 3d represents a J–K flip-flop having a clock input C, J and K inputs, Q and $\bar{Q}$ outputs and a direct reset input R. The direct reset supersedes the other inputs and sets output Q high and output $\bar{Q}$ low. The J and K inputs, when both high, permit outputs Q and $\bar{Q}$ to change state at each negative transition of the clock input C. When both J and K are low the outputs Q and $\bar{Q}$ will not change state in response to an input at C. When J and K are in opposite states, the next negative trigger transition causes Q and $\bar{Q}$ to align with J and K respectively.

Figure 4:
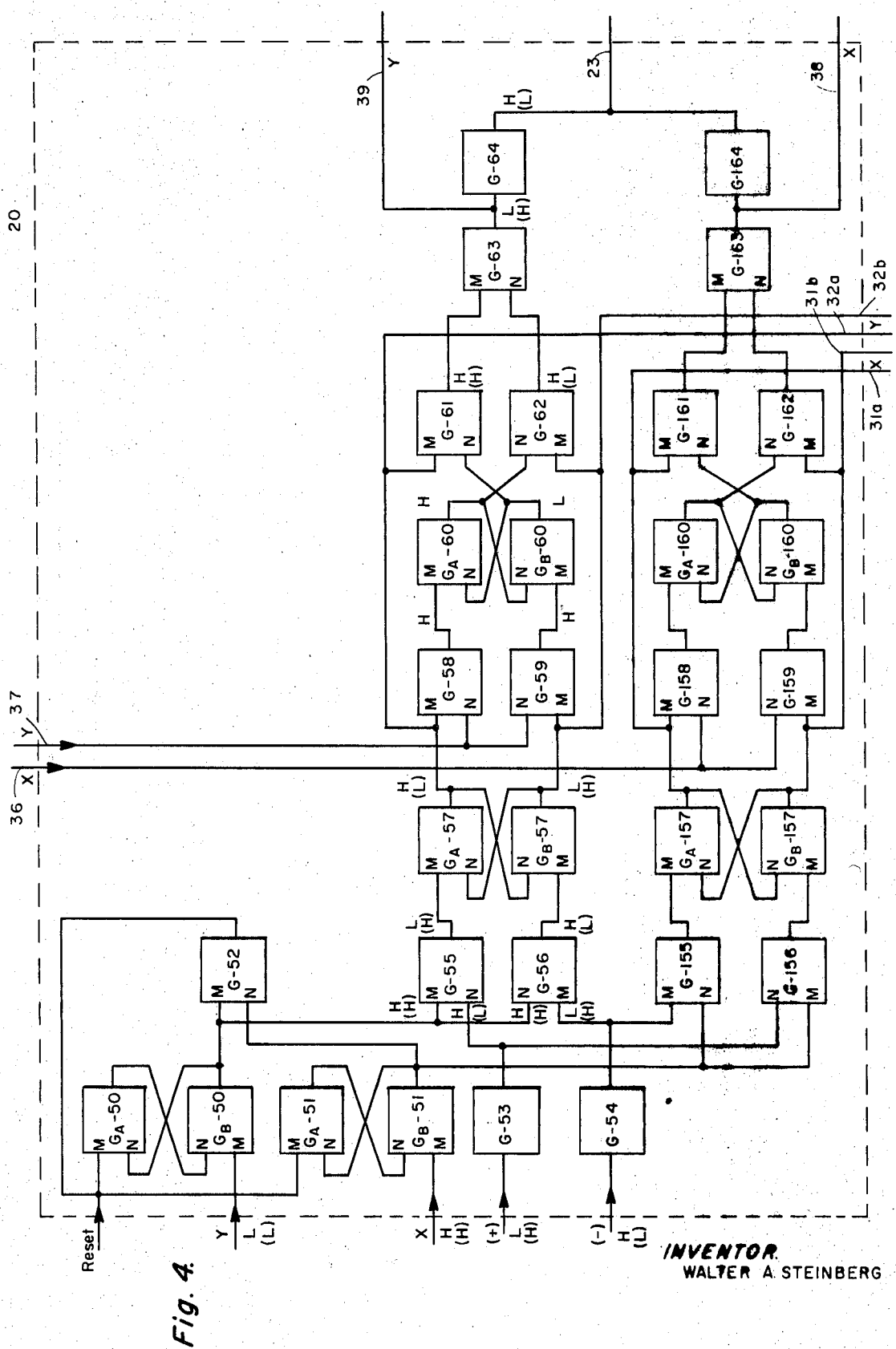
FIG. 4 is a schematic diagram of a direction comparator for use in the system of FIG. 1.
Figure 5:
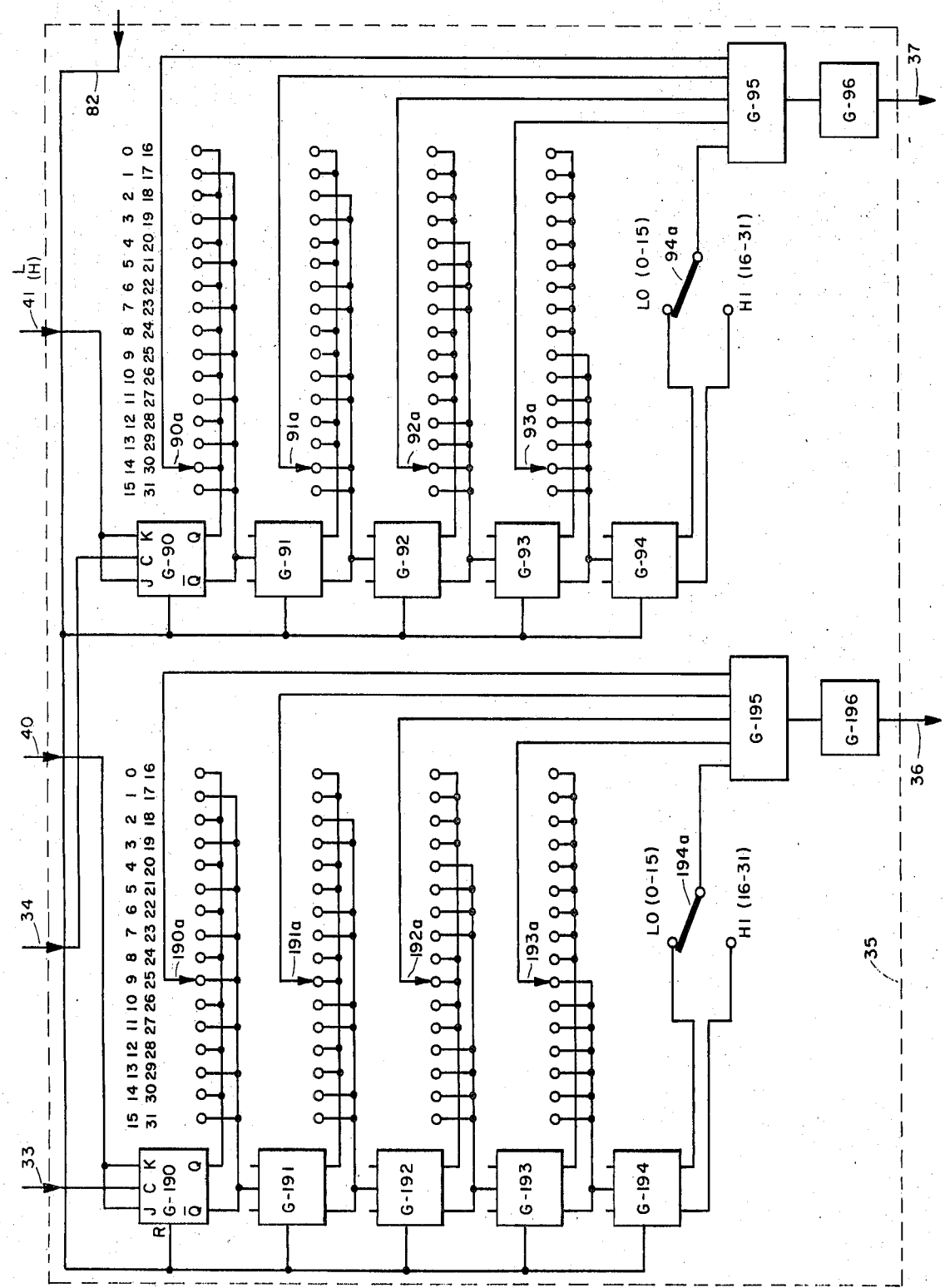
FIG. 5 shows details of a backlash storage unit.
Figure 6:
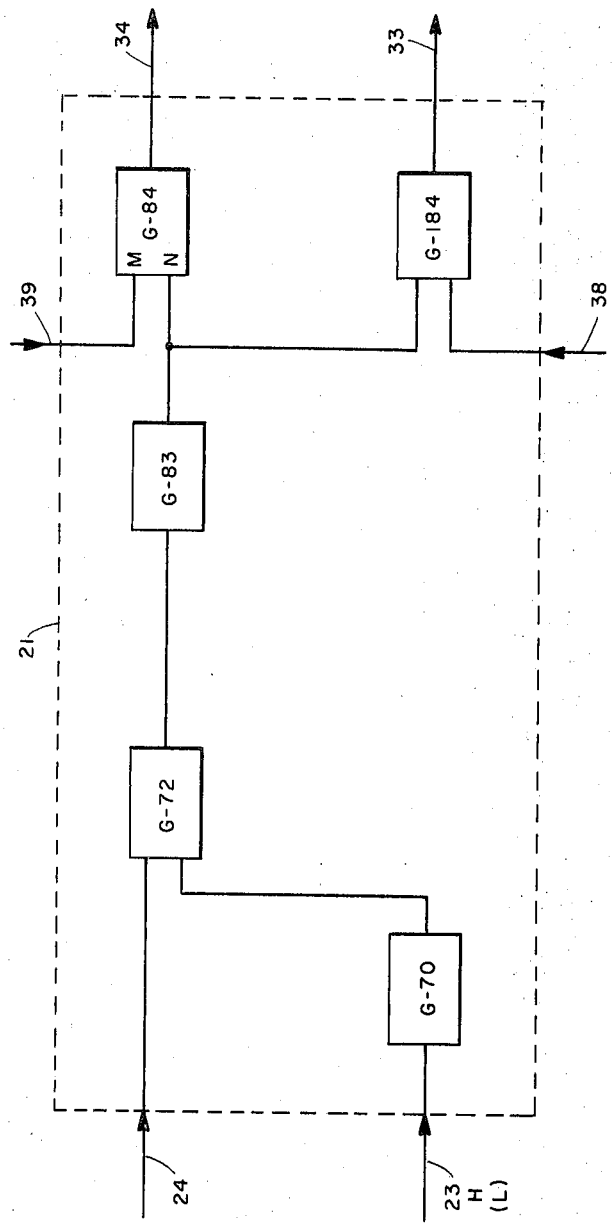
FIGS. 6 and 7 are schematic diagrams of backlash and position controls.

FIG. 4 shows details of the direction comparator 20 which, as indicated in the block diagram of FIG. 1, receives inputs designated Reset Y, X, (+) and (−) from the decoder 17 and inputs via leads 36 and 37 from the backlash storage 35. Outputs are provided via leads 31a, 31b and 32a and 32b to the X and Y motors 13 and 14 respectively, via lead 23 to the backlash and position controls and to the backlash control and backlash storage units over leads 38 and 39. Assuming that no signal is applied to decoder 17 from tape reader 16, the Y, X, (+) and (−) inputs will all be in the high state. Under these conditions, the outputs of gates $G_B$–50 and $G_B$–51 in direction comparator 20 are low and the output of gate G–52 is high. This set of output states is obtained by applying a low reset signal from decoder 17 to the M inputs of gates $G_A$–50 and $G_A$–51 at the end of each command sequence.

Assume that the first command is for a displacement of magnitude L along the Y axis in a direction defined as positive (+). The magnitude signal is transmitted by decoder 17 to the Y preset counter 18y, the Y axis signal to the M input gate $G_B$–50 and the (+) direction signal to the input of gate $G_B$–53 in direction comparator 20. Thus, the M inputs to gates $G_B$–50 and $G_B$–51 are low and high respectively and the M inputs to gates G–53 and G–54 are low and high respectively. This is indicated by the top row of "H" and "L" symbols at the gate input and output terminals in FIG. 4.

When the M input to $G_B$-50 goes low, the output of this gate goes high driving the M input of gate G-55 and the N input of G-56 high. Since the input to G-53 is low the output will be high as will the N input to gate G-55. Similarly, the M input to gate 56 will be low due to the inverting action of gate G-54. Since both inputs to G-55 are high, the output will be low. The output of G-56 will be high because the M input of G-56 is low.

The outputs of G-55 and G-56 are coupled to the M inputs of dual gate G-57 resulting in a high state at the output of $G_A$-57 and a low state at the output of $G_B$-57. This drives the M inputs of gates G-58 and G-59 high and low respectively. For reasons which shall be explained later, the signal coupled to the N inputs of gates G-58 and G-59 is low at this time and therefore the outputs of G-58 and G-59 are high. The output of gate $G_A$-57 is also coupled to lead 32a and the output of gate $G_B$-57 to lead 32b which energize and determine the direction of rotation of Y motor 14.

Figure 7:
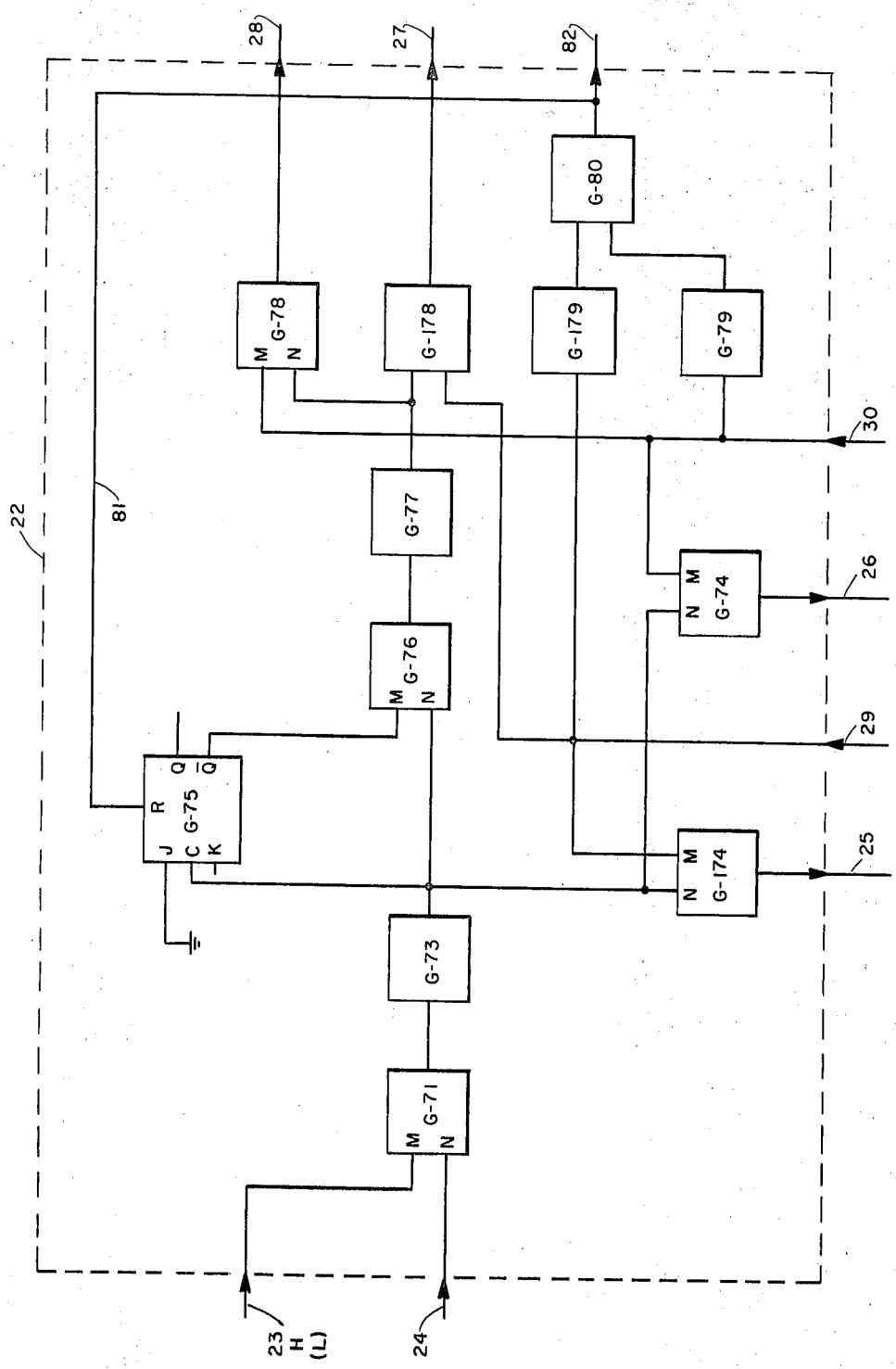

Dual gate G-60 stores the direction of the previous motion along the Y axis. Assuming that the previous Y direction is the same as the present one (i.e. positive) the output of $G_A$-60 is high and the output of $G_B$-60 is low. Consequently, gates G-61 and G-62 each have a high input and a low input resulting in a high output at both gates. Thus, a low output is obtained from gate G-63 and a high output from gate G-54:

The output of gate G-64 is coupled via lead 23 to the input of gate G-70 in the backlash control 21 (FIG. 6) and to the M input of gate G-71 in the position control 22 (FIG. 7). The low signal at the output of G-70 prevents pulses from generator 19 from passing through gate G-72 as explained in connection with FIGS. 3a-3b thereby cutting off the backlash control. The position control is activated however by the high signal to input M of G-71 and pulses from generator 19 are transmitted via lead 24, gate G-71 through inverting gate G-73 to the N input of gate G-74.

The Y preset counter 18y, whose decades were set by the magnitude signal from decoder 17 to the nines complement of the digits of the number of pulses required to move machine member 10 a distance L along the Y axis, is actuated by the first positive pulse at the output of gate G-73. This pulse and each pulse received thereafter from generator 19 via lead 24 is counted by counter 18y until the counter reaches zero. The pulses from generator 19 are also transmitted through gate G-76, inverter G-77 and gate G-78 to the Y motor 14 via lead 28.

The J-K flip-flop G-75 prevents the initial pulse from reaching gate G-78 since the $\overline{Q}$ output to the M input of G-76 is low prior to receipt of the first pulse. The trailing edge of the first positive pulse received at the output of G-73 (whose leading edge was counted by preset counter 18y) energizes the clock input of the J-K flip-flop G-75 driving the $\overline{Q}$ output high and allowing all subsequent positive pulses to pass through gate G-76. The number of pulses transmitted to the motor up to the point where the counter reaches zero will then be equal to the number whose digits nines complements were preset into the counter.

After the pulses applied to the N input of G-74 have driven counter 18y to zero, a signal is transmitted from the counter over lead 30 driving the M input of gate G-74 low thereby cutting off the pulse input to the preset counter. Gate G-78 is also cut off by the low signal to input M preventing any further pulses from reaching motor 14. The low signal on lead 30 is also applied through gates G-79, G-80 and lead 81 to the reset input R of G-75 thereby driving the $\overline{Q}$ output low and cutting off G-76. The operations of gates G-174, G-178 and G-179 are identical to those of gates G-74, G-78 and G-79 for displacements along the X axis.

The output of gate G-80 is also coupled to the backlash storage 35 via lead 82 for reasons that will become apparent when the backlash storage unit is described. (In addition, by means not shown in the drawings, G-80 cuts off clock pulses to the inputs of gates G-71 and G-72 in the position and backlash controls 22 and 21 and restarts the tape reader 16.)

Referring back to FIG. 4, if the next Y channel command from tape 15 is for another displacement in the positive direction, the outputs of the gates in the direction comparator will remain the same. In particular, the polarity of the voltage across leads 32a, 32b will remain the same causing Y motor 14 to rotate in the same direction when pulses are applied over lead 28. Also, the output of G-64 remains high thereby maintaining the backlash control 21 cut off and the position control 22 activated.

However, if the next command for a displacement along the Y direction is in the opposite direction, the output states of the gates in direction comparator 20 change to the high and low states indicated in parenthesis in FIG. 4. That is, when the (+) input to gate G-53 is made high and the (−) input to G-54 low, this results in a reversal in the output state of gate G-55 from low to high and a reversal in the output state of G-56 from high to low. As a result, the outputs of dual gate G-57 reverse as do the M inputs to gates G-61 and G-62. Since the low signal at the N inputs of gates G-58 and G-59 keep the outputs of both of these gates in the high state, the outputs of dual gate G-60 (which stores the previous displacement direction information) remains unchanged. Thus, gate G-61 has two low inputs and gate G-62 has two high inputs resulting in the output of G-62 going low driving the output of G-63 high and the output of G-64 low.

When the output of gate G-64 goes low, the M input to G-71 in the position control (FIG. 7) goes low cutting off gate G-71 and preventing pulses from generator 19 from entering the position control.

The low signal on lead 23 is also applied to gate G-70 in the backlash control (FIG. 6) driving the input to G-72 high and allowing the pulses on lead 24 from generator 19 to reach the N input of gate G-84 through inverting gate G-83. The M input of G-84 is high since it is coupled by lead 39 to the output of gate 63 in direction comparator 20 and therefore each negative pulse applied to the N input of G-84 drives the output of G-84 high. The pulses generated at the output of G-84 are transmitted via lead 13b to the Y motor 14.

Certain features of direction comparator 20 may be summarized at this point. The direction of the previous displacement along the Y axis is determined by the output states of direction storage dual gate G-60. The outputs of gate G-60 are compared with the input signal from direction order dual gate G-57 in comparison gates G-61 and G-62. If the outputs of G-61 and G-62 are both high, the present displacement is in the same direction as the previous displacement and the output of G-63 is low preventing pulses from being transmitted through G-84 in the backlash control 21. Also, the output of gate G-64 is high cutting off the backlash control 21 and activating the position control 22.

If the outputs of either G-61 or G-62 is low, the present displacement is the reverse of the previous displacement, and the output of G-63 is high allowing pulses to be transmitted through gate G-84 to the Y motor. Also, the output of gate G-64 is low activating the backlash control 21 and cutting off the position control 22.

The pulses reaching Y motor 14 through the backlash control are for the purpose of compensating for backlash in feed screw 12. Thus, the number of pulses transmitted should be exactly equal to those needed to take up the backlash $d_y$ in feed screw 12. This is accomplished by means of the backlash storage 35 shown in detail in FIG. 5.

The backlash storage 35 comprises X and Y five-stage binary counters each coupled to a corresponding five-section backlash switch having thirty-two positions. The Y binary counter consists of J-K flip-flops 90-94, each having Q and $\overline{Q}$ outputs connected to selected terminals of the backlash switch. The J and K inputs of G-90 are connected to the output of gate G–63 in direction comparator 20 by leads 39 and 41. The clock input C is connected to the output of gate G–84 in the backlash control 21 by lead 34. Each of the $\bar{Q}$ outputs of J–K flip-flops G–90 and G–93 are also connected to the clock input of the succeeding flip-flop and the reset inputs of G–90 and G–93 are coupled via lead 82 to the output of G–80 in the position control 22. Movable arms G–90a to G–94a are connected to the inputs of a gate G–95 having its output coupled through an inverter G–96 and lead 37 to the N inputs of gates G–58 and G–59 in direction comparator 20.

The top row of numerals 0–15 above the switch positions indicate settings of 0 to 0.015 inch backlash when arm 94a is in the "Lo" position. The same positions provide backlash settings of 0.016 to 0.031 inch when arm 94a is in the "Hi" position. If each pulse corresponds to an incremental movement of 0.001 inch then the setting of the switch corresponds to the number of pulses required to compensate for the backlash $d_y$.

The operation of the backlash compensation system is as follows: Assume that, as in the example, the average value of the backlash $d_y$ over the length of the feed screw 12 is 0.014 inch. Switch arms 90a–93a are manually set on position 14 and arm 94a is set on "Lo" as shown. G–90 to G–94 were all reset by the low signal applied to the reset inputs from gate G–80 (FIG. 7) via lead 82 when the last displacement was completed thereby causing the Q outputs to be high and the $\bar{Q}$ outputs to be low. Initially, the J and K inputs to G–90 are low because the output of G–63 prior to receiving the present command is low. Clock pulses applied over lead 34 to G–90 will have no effect on the Q and $\bar{Q}$ outputs since both the J and K inputs are in the low state. The output of G–95 is high because, with the switch at set position 14, arms 91a, 92a and 93a, which are connected to $\bar{Q}$, are all low. Inverter G–96 converts the high output of G–95 to a low signal which is applied over lead 37 to the N inputs of gates G–58 and G–59 in direction comparator 20. This low signal prevents any change in the state of dual gate G–60 which stores the direction of the previous Y displacement. It shall be noted that with flip-flops G–90 to G–94 reset, all positions of the switch except zero will result in the N inputs of G–58 and G–59 being in the low state. (For zero setting, no backlash correction is to be introduced and therefore dual gates G–60 are allowed to switch with each change in the direction of displacement resulting in continuous activation of the position control.)

When a change in direction does take place, the output of G–63 switches from low to high causing the J and K inputs to G–90 to go high. The first negative pulse received from the backlash control 21 over lead 34 switches the Q output of G–90 to low, and the $\bar{Q}$ output to high. G–91 is not switched by this pulse because the $\bar{Q}$ output of G–90 went from low to high and the clock input of the J–K flip-flops is not affected by a positive pulse. Thus, four of the five inputs to G–95 are now low and the state of the N inputs of gates G–58 and G–59 remain low. At the second pulse, the $\bar{Q}$ output of G–90 goes low switching the $\bar{Q}$ output of G–91 to high and the Q output to low. The output of G–95 remains high because arms 92a and 93a remain low. This process continues until fourteen pulses are received at which time all of the outputs connected to arms 90a to 94a become high. More specifically, the Q outputs of G–90 and G–94 and the $\bar{Q}$ outputs of G–91, G–92 and G–93 all become high upon receipt of the fourteenth pulse causing the output of G–95 to go low driving the N inputs of G–58 and G–59 high.

Since fourteen pulses have been transmitted to the Y motor all of the backlash in the Y lead screw 12 has been taken up and pulses from generator 19 must now be transferred from the backlash control 21 to the position control 22. This is accomplished when the N inputs of G–58 and G–59 go high causing the output of G–59 to transfer to its low state. The output of $G_A$–60 is driven low and the output of $G_B$–60 driven high by the change in the M input to $G_B$–60 from high to low. As a result, the outputs of G–61 and G–62 become high driving the output of G–63 low and the output of G–64 high.

When the output of G–63 goes low it cuts off via leads 39 and 39a the transmission of pulses through gate G–84 in the backlash control 21 as well as driving the J and K input of G–90 in backlash storage 35 low preventing clock pulses thereto from having any further effect. The high output of G–64 disables gate G–72 in the backlash control 21 and activates gate G–71 in the position control permitting positioning to being as previously explained. When the number of pulses determined by the preset counter 18y has been transmitted by position control 22, a reset pulse is applied over lead 82 to the J–K flip-flops in the backlash storage 35 resetting them for the next signal.

Although operation of the position control system has been explained for displacements along the Y axis, it shall be understood that displacements along the X axis take place in exactly the same way. Simultaneous movements on both the X and Y axes may be programmed in which case any necessary backlash compensation in either or both axes is accomplished prior to enabling position control 22 by means of a signal on line 23. In the figures, the X axis gates have been given a number which is 100 greater than the number given the Y axis components.

As many changes and modifications could be made in the disclosed embodiment without departing from the scope thereof, it is intended that all matter contained in the above description or shown in the accompanying drawings shall be interpreted as illustrated and not in a limiting sense.

What is claimed is:

1. A control system for positioning a machine member in accordance with a set of predetermined input instructions and compensating for backlash in the mechanical linkage to said member comprising
 (a) motor driving means connected to said machine member by means of said mechanical linkage,
 (b) pulse generating means,
 (c) first and second control means having inputs coupled to the output of said pulse generating means and outputs coupled to said driving means, said first control means transmitting pulses from said pulse generator to said driving means for positioning said machine member and said second control means transmitting pulses from said pulse generator to said driving means for compensating for backlash in the mechanical linkage to said machine member,
 (d) direction comparator means for comparing the directional component of said input instructions with the directional component of the immediately preceding input instructions coupled to the inputs of said first and second control means, said directional comparator means activating said first control means if said directional components are the same and activating said second control means if said directional components are opposite, and
 (e) backlash storage means having an input coupled to an output of said second control means and an output coupled to an input of said direction comparator means, said blacklash storage means providing a signal to said direction comparator means for cutting off said second control means and activating said first control means when the number of pulses transmitted through said second control means from said pulse generating means corresponds to the backlash correction stored in said blacklash storage means.

2. A control system for positioning a machine member as defined by claim 1 wherein said direction comparator means comprises (a) means for storing the directional component of a first input instruction, (b) means coupled to the means recited in paragraph (a) hereof for comparing the directional component of said first input instruction with a second input instruction, and (c) means coupled to the means recited in paragraph (a) hereof and to said first and second control means for producing a first signal when the directional components of said first and second input instructions are the same and a second signal when the directional components of said first and second input instructions are opposite, said first signal activating said first control means and cutting off said second control means and said second signal cutting off said first control means and activating said second control means.

3. A control system for positioning a machine member as defined by claim 1 wherein said backlash storage means comprises (a) backlash switching means for adjusting said storage means to a predetermined value corresponding to the backlash in said mechanical linkage, (b) counting means coupled to said backlash switching means and to said second control means for counting the pulses at the output of said second control means, and (c) means coupled to said backlash switching means for producing an output signal when the number of pulses at the output of said second control means equals said predetermined value corresponding to the backlash in said mechanical linkage.

4. A control system for positioning a machine member as defined by claim 1 which further comprises a preset counter coupled to said first control means, said preset counter receiving the displacement information in said predetermined input instructions, counting the pulses supplied by said pulse generating means through said first control means to said motor driving means and cutting off said first control means when the number of pulses transmitted to said motor driving means corresponds to said displacement information.

5. A control system for positioning a machine member in accordance with a set of predetermined input instructions and compensating for backlash in the mechanical linkage to said member comprising (a) a synchronous motor connected to said machine member by said mechanical linkage, said synchronous motor having a control input and a motor direction input, the displacement of the shaft of said motor being proportional to the number of voltage pulses applied to said control input and the direction of displacement being determined by the polarity of the voltage applied to said motor direction input, (b) a pulse generator, (c) a position control having a first input coupled to the output of said pulse generator, a second input, a third input, a first output coupled to the control input of said synchronous motor, and a second output, (d) a backlash control having a first input coupled to the output of said pulse generator, a second input and an output coupled to the control input of said synchronous motor, (e) a direction comparator having axis, direction and backlash inputs, a first output coupled to the motor direction input of said synchronous motor and a second output coupled to the second inputs of said position and backlash controls, said direction comparator activating said position control if said direction input corresponds to the same direction along a given axis as the immediately preceding direction input along said axis and activating said backlash control and reversing the polarity of the voltage applied to said synchronous motor when said direction input is in the opposite direction from said immediately preceding direction input, and (f) a backlash storage having an input coupled to the output of said backlash control and an output coupled to the backlash input of said direction comparator, said backlash storage providing a signal to said direction comparator for cutting off said backlash control and activating said position control when the number of pulses transmitted through said backlash control from said pulse generating means corresponds to the backlash correction stored in said backlash storage.

6. A control system for positioning a machine member as defined by claim 5 wherein a preset counter is coupled to the third input of said position control, said preset counter receiving the displacement information in said predetermined input instructions, counting the pulses supplied by said pulse generator through said position control to the control input of said synchronous motor and cutting off said position control when the number of pulses transmitted to said synchronous motor corresponds to said displacement information.

7. A control system for positioning a machine member as defined by claim 6 wherein said backlash storage comprises (a) a binary counter having a plurality of stages, each of said stages having a clock input, a reset input and first and second outputs, one output of each of said stages being coupled to the clock input of the succeeding stage, (b) switching means having a plurality of switching sections each consisting of a movable arm and first and second fixed segments coupled to the first and second outputs respectively of said stages, and (c) gating means having a plurality of inputs, each input being coupled to one of said movable arms and an output coupled to said direction comparator, all of the inputs to said gating means being in the same state when the number of pulses applied to the clock input of the first stage of said binary counter is equal to the setting of the movable arms on said switching means.

8. A control system for positioning a machine member as defined by claim 7 wherein the reset inputs of said binary counter stages are coupled to the second output of said position control, said counter stages being reset by a signal from said position control when said position control is cut off by said preset counter.

9. The method of displacing a machine member in accordance with a set of predetermined input instructions and compensating for backlash in the mechanical linkage to said member, said method comprising the steps of (a) determining the magnitude of the backlash in said mechanical linkage, (b) determining whether the desired displacement is in the same or opposite direction from the preceding displacement, (c) displacing said mechanical linkage by a first amount equal to the magnitude of said backlash when the desired displacement is in the opposite direction from the preceding displacement, and (d) displacing said mechanical linkage by a second amount corresponding to said set of predetermined input instructions.

10. In a control system for positioning a machine member in accordance with a set of predetermined input instructions, said machine member being driven by motor means connected thereto by a mechanical linkage, the combination comprising (a) backlash storage means having an input and an output, said storage means producing an output signal when the number of pulses applied to its input equals a predetermined value corresponding to the backlash in said mechanical linkage, (b) direction comparator means having an input coupled to the output of said backlash storage means and an output, said comparator means comparing the directional component of said input instructions with the directional component of a preceding input instruction, (c) control means having a first input for receiving electrical pulses, a second input coupled to the output of said direction comparator means, and an output coupled to the input of said backlash storage means and to said motor means, said control means applying to said motor means a first number of said electrical pulses corresponding to the backlash in said mechanical linkage when the directional component of said input instructions is opposite to the directional component of a preceding input instruction, said first number of pulses being terminated when said backlash storage means output signal is applied to said direction comparator means, a second number of pulses corresponding to said input instructions being applied to said motor means following application of said storage means output signal to said direction comparator means.

References Cited

UNITED STATES PATENTS 3,355,642 11/1967 Leenhouts _____ 318—28
3,392,314 7/1968 Waller _____ 318—18

BENJAMIN DOBECK, Primary Examiner

U.S. Cl. X.R.

318—602